May 7, 1957  G. J. SHAW  2,791,080
ROTARY TYPE POWER LAWN MOWER WITH LATERAL DISCHARGE
Filed July 21, 1954
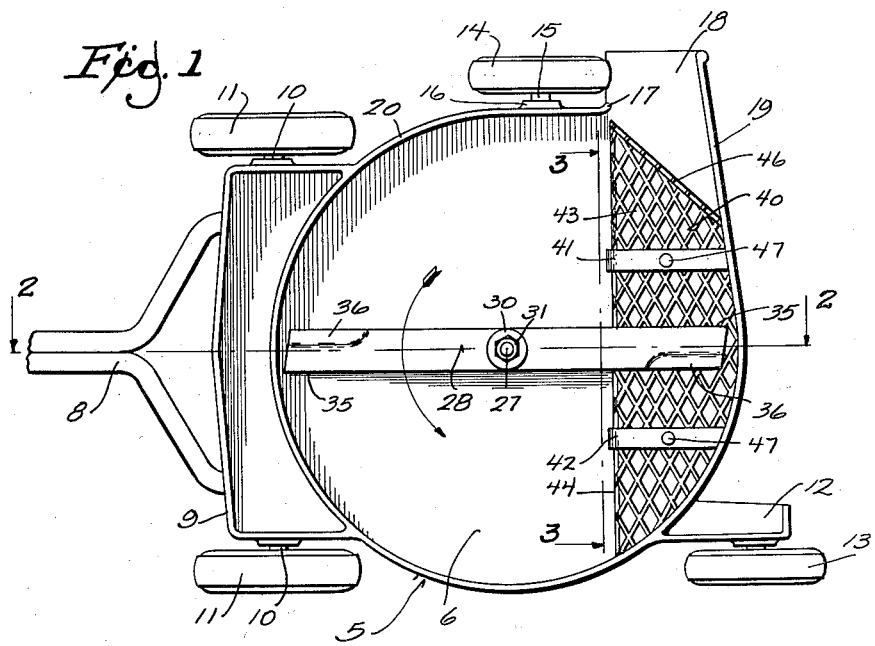
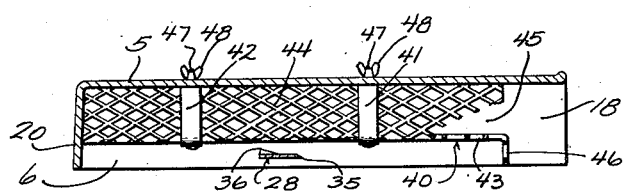
INVENTOR.
GERALD J. SHAW
BY
Wheeler, Wheeler & Wheeler
ATTORNEYS

2,791,080

ROTARY TYPE POWER LAWN MOWER WITH LATERAL DISCHARGE

Gerald J. Shaw, Lamar, Mo., assignor to Outboard Marine Corporation, a corporation of Delaware Application July 21, 1954, Serial No. 444,680

11 Claims. (Cl. 56—25.4)

This invention relates to a rotary type power lawn mower with lateral discharge.

A feature of the invention consists of a screen attachment readily applicable and removable and fitted between the rotary blade and the top of the generally circular chamber in which the blade operates, to provide a generally horizontal passage above the screen and tangentially of the housing in communication with a lateral discharge port. The screen desirably comprises expanded metal having sharp edges in close proximity to the path of the blade to assist in comminuting leaves and the like as a prerequisite to their discharge through the lateral opening.

Another feature of the invention consists in the relation of one of the supporting wheels to the discharge port. Particularly when the mower is used for mulching leaves, and also in its routine use for cutting grass, there may be times when the cut material ejected through the discharge opening will tend to accumulate at the opening. In accordance with the present invention, one of the supporting wheels has its forward portion at or even projecting slightly into the discharge port, whereby the motion of the wheel tends to break up and dislodge any material tending to accumulate at this point.

In the drawings:

Fig. 1 is an inverted plan view of a mower incorporating the invention.

Fig. 2 is a detail view taken in section on the line 2—2 of Fig. 1.

Fig. 3 is a detail view taken in section on the line 3—3 of Fig. 1, portions being broken away.

The construction of the mower is somewhat conventional. Its only frame 5 consists of a housing having a downwardly opening generally circular chamber 6. The housing has ears at 7 to receive the handle 8 by which it is guided and propelled. These ears are mounted at the sides of a rearward housing extension 9 from which project laterally the studs 10 for the rear wheels 11. An integral bracket portion 12 projects forwardly at one side of the housing for the mounting of one of the front wheels 13. The other front wheel 14 has its axle 15 mounted on a lateral boss 16 in a position such that the forward portion of the wheel projects very slightly forwardly of the housing margin 17 at the rear of discharge port 18 formed by extending tangentially the portion 19 of the wall or skirt 20 of the housing.

A depression provided at 21 in the top of the circular chamber 6 provides a seat at 22 to which the supporting flange 23 of engine 24 is bolted.

The flange is formed on the crank shaft bearing 25 and seat 22 is apertured at 26 to permit a portion of the bearing to extend therethrough. Mounted on the crank shaft 27 within the circular chamber 6 is the shear blade 28. In accordance with conventional practice, this is fixed between a pair of friction driving disks 29, 30 by a retaining nut 31 threaded on the crank shaft.

The leading margins of blade 28 are beveled to cutting edges 35. The trailing margins are desirably bent somewhat upwardly at 36 to assist in circulation of air currents within the housing to develop something of a vortex therein so that air will be expelled, along with entrained grass clippings and other debris, through the tangential discharge port 18.

When the mower is to be used for leaf mulching purposes, it is desirably provided with a screen attachment in the form herein disclosed. The partition screen 40 is desirably made of expanded metal in order to take advantage of the relatively sharp edge surfaces inherent in a foraminous screen of that particular material. Assuming that the expanded metal is of relatively heavy gauge, it may be entirely self-sustaining. However, I prefer to provide angle brackets at 41 and 42 having generally horizontal portions and generally upright portions as best shown in Fig. 2. The screen 40 likewise includes a generally horizontal portion 43 and a generally upright portion at 44, the former lying immediately above the path of movement of the blades and the latter extending across the housing on a minor chord thereof which leads directly to the margin 17 of the housing at the rear of the tangential discharge port. Thus the screen forms a transverse passage at 45 leading directly to the port and providing a duct which, in practice, is more than half of the total depth of the housing.

In order to prevent material from escaping below the screen, the screen is desirably provided with a downwardly turned flange at 46 outside the path of movement of the blades and in a position to intercept material thrown from the ends of the blades during their rotation.

The top margin of the upright portion 44 of the screen, and the top ends of the corresponding portions of brackets 41 and 42 rest against an under surface of the top wall of the blade chamber 6, while the forward margin of the screen and the forward ends of brackets 41 and 42 are made to fit against the front wall of the housing. A single bolt 47 is passed through each bracket and extends upwardly through the top of housing 5 where it is provided with a wing nut 48. Each bolt is desirably surrounded by a spacer sleeve 49. By manipulating the wing nuts, the attachment may be mounted or removed without tools in an extremely short space of time.

With the device in use, the material acted upon by the blades, and particularly dry material such as leaves, tends to be reduced to particles of small size before being discharged from the housing. The upwardly turned flanges on the rear margins of the blades will tend to lift the material from the ground. While there is no shearing action in the sense of actual contact between the blades and the screen, nevertheless the blades move in such close proximity to the screen as to drive the material forcibly against the relatively sharp edges of the expanded metal which is desirably used to constitute the screen. This results in prompt and thorough comminution of material, which thereupon moves outwardly through the channel 45 formed by the screen until it emerges, with the air blast, through the tangential outlet 18.

Any tendency of grass or leaves or other material to bridge across discharge port 18 is counteracted by the movement of the periphery of wheel 14, the forward margin of which forms one side of the discharge port at the narrowest point of the passage. As the mower moves over the surface of the ground, the rotation of the wheel dislodges any material tending to bridge across the port, thus keeping the port free at all times.

I have found it advantageous to provide a screen which has both upright and horizontal portions and which forms, with the housing, a passage extending rectilinearly toward the discharge port on the chord of the generally circular chamber in which the blades rotate. At all points, the passage enclosed by the screen is approximately rectangular in transverse section and it is completely unobstructed, any brackets used being desirably on the under surface and the rear surface of the horizontal and vertical portions of the screen.

I claim:

1. In a rotary mower, the combination with a housing provided with a wall portion forming one side of a discharge port, of a wheel supporting the housing and having a rotatable peripheral portion opposed to said wall portion and constituting the other side of said discharge port, whereby wheel rotation assists in dislodging accumulations tending to bridge the port.

2. The device of claim 1 in which the housing is provided with a plurality of wheels, the said port being disposed immediately ahead of the wheel first mentioned, whereby the peripheral portion of said wheel which is proximate to said port is moving downwardly, the said housing and the said port being open in a downward direction whereby the port wall portion proximate the wheel has a free lower end from which such material may be discharged by the rotation of the wheel.

3. The device of claim 2 in which the housing is provided internally with a screen having a generally horizontal portion extending toward said port, said mower comprising a blade mounted for rotation within the housing upon a path immediately beneath the horizontal portion of the screen.

4. The device of claim 3 in which the screen comprises expanded metal having sharp edges in close proximity to the path of blade movement to cooperate therewith in the comminution of material acted on by said blades.

5. In a rotary mower, the combination with a wheel-supported housing having a skirt portion enclosing a downwardly opening cavity and providing a laterally opening delivery port, the skirt portion of said cavity having a terminal margin at the rear of the port and being extended tangentially outwardly at the front of the port, one of the wheels supporting said housing having a forward peripheral portion in proximity to said margin whereby to tend to clear said port during wheel rotation, together with a baffle extending across the housing and having a rear wall portion disposed substantially on a chord of the housing and leading toward the said skirt margin at the rear of the opening, and a generally horizontal expanded metal screen portion extending from said rear wall portion intermediate the height of the housing to the skirt at the front of the housing, a prime mover mounted on the housing and having a shaft extending into said cavity, and blade means mounted on said shaft for rotation in the cavity in a direction to impel material toward said opening and at a level immediately beneath the generally horizontal screen portion of the baffle.

6. The device of claim 5 in which the screen portion of the baffle has a depending flange at the level of said blade means and intervening between the path of blade rotation and the discharge opening.

7. The device of claim 5 in which the baffle is provided with spaced brackets, bolts extending upwardly from the brackets through the housing, nuts on the bolts, and spacing means limiting the approach of the brackets to the top of the housing upon the tightening of the nuts.

8. In a rotary mower comprising a wheel supported housing having a top wall, a marginal skirt and a blade mounted for rotation within the housing, said skirt having a discharge opening for material acted on by the blade, a duct for conveying such material to said opening, said duct comprising in part said housing top wall and skirt, and a screen partition extending across the housing and above the path of blade rotation and comprising a foraminous wall portion of said duct.

9. The device of claim 8 in which said screen partition comprises expanded metal having sharp edges in close proximity to the path of blade movement to cooperate therewith in the comminution of material acted on by said blade.

10. The device of claim 8 in which said screen comprises angularly related portions having edge margins respectively abutting the top wall and skirt of the housing.

11. The device of claim 10 in combination with bolt means detachably connecting the screen partition to the housing.

References Cited in the file of this patent

UNITED STATES PATENTS

| | | |
|---|---|---|
| D. 172,936 | Phelps | Aug. 31, 1954 |
| 2,663,984 | Clark | Dec. 29, 1953 |
| 2,675,661 | Titzer | Apr. 20, 1954 |
| 2,719,396 | Morris et al. | Oct. 4, 1955 |